(12) United States Patent
Siomina

(10) Patent No.: US 10,588,107 B2
(45) Date of Patent: Mar. 10, 2020

(54) METHODS OF POSITIONING IN A SYSTEM COMPRISING MEASURING NODES WITH MULTIPLE RECEIVING POINTS

(71) Applicant: Telefonaktiebolaget L M Ericsson (publ), Stockholm (SE)

(72) Inventor: Iana Siomina, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1105 days.

(21) Appl. No.: 14/062,524

(22) Filed: Oct. 24, 2013

(65) Prior Publication Data

US 2014/0120947 A1    May 1, 2014

Related U.S. Application Data

(60) Provisional application No. 61/718,894, filed on Oct. 26, 2012.

(51) Int. Cl.
*H04W 4/02*     (2018.01)
*H04W 64/00*    (2009.01)
(Continued)

(52) U.S. Cl.
CPC .......... *H04W 64/00* (2013.01); *G01S 5/0221* (2013.01); *G01S 5/06* (2013.01); *H04W 4/50* (2018.02)

(58) Field of Classification Search
CPC ................................. H04W 4/02; H04W 24/08
(Continued)

(56) References Cited

U.S. PATENT DOCUMENTS

| 7,162,252 B2 * | 1/2007 | Kennedy, Jr. ......... H04W 64/00 340/539.13 |
| 2003/0096622 A1 | 5/2003 | Moilanen |

(Continued)

FOREIGN PATENT DOCUMENTS

| CN | 1412573 A | 4/2003 |
| CN | 101437288 A | 5/2009 |

(Continued)

OTHER PUBLICATIONS

Unknown, Author. "3rd Generation Partnership Project; Technical Specification Group Radio Access Network; Evolved Universal Terrestrial Radio Access (E-UTRA); Physical Channels and Modulation (Release 11)." 3GPP TS 36.211 V11.0.0. Sep. 2012.

(Continued)

*Primary Examiner* — Jinsong Hu
*Assistant Examiner* — Farideh Madani

(57) ABSTRACT

Techniques for systems in which a measuring node is associated with multiple antenna, including techniques for selecting and configuring the set of receiving antennas suitable for performing uplink measurements for a given wireless device. An example method, as implemented by a network node, is for controlling measurements of radio signals transmitted by a wireless device, where the measurements are performed by a measuring node associated with two or more receiving points. The example method begins with obtaining a receiving point configuration for at least one measuring node associated with two or more receiving points, and continues with selecting one or more receiving points for performing measurements, based on the obtained configuration. The selected receiving points are then configured for performing the measurements.

4 Claims, 10 Drawing Sheets

(51) Int. Cl.
*G01S 5/02* (2010.01)
*G01S 5/06* (2006.01)
*H04W 4/50* (2018.01)

(58) Field of Classification Search
USPC .................. 455/456.1–457; 370/241, 241.1
See application file for complete search history.

(56) References Cited

U.S. PATENT DOCUMENTS

| | | | |
|---|---|---|---|
| 2006/0202834 A1* | 9/2006 | Moriwaki | G01D 21/00 340/573.1 |
| 2007/0060067 A1* | 3/2007 | Ruuska | H04B 17/0087 455/67.11 |
| 2007/0161371 A1* | 7/2007 | Dobrowski | H04L 41/00 455/423 |
| 2008/0220725 A1* | 9/2008 | Schedelbeck | H04L 5/1438 455/69 |
| 2009/0117907 A1* | 5/2009 | Wigren | G01S 19/06 455/440 |
| 2010/0278035 A1* | 11/2010 | Li | H04B 1/71052 370/209 |
| 2010/0291947 A1 | 11/2010 | Annamalai | |
| 2011/0009067 A1* | 1/2011 | Iwamura | H04W 24/10 455/67.11 |
| 2011/0185032 A1* | 7/2011 | Hiramoto | H04L 67/1097 709/212 |
| 2011/0207477 A1* | 8/2011 | Siomina | G01S 5/0278 455/456.2 |
| 2011/0249625 A1* | 10/2011 | Martin De Nicolas | H04M 3/2263 370/328 |
| 2011/0310377 A1* | 12/2011 | Ohishi | G01S 7/497 356/5.01 |
| 2012/0184301 A1* | 7/2012 | Jovicic | G01S 5/0081 455/456.5 |
| 2012/0214512 A1 | 8/2012 | Siomina et al. | |
| 2013/0040664 A1* | 2/2013 | Zhang | G01S 5/0036 455/456.5 |
| 2013/0045806 A1* | 2/2013 | Bloodworth | A63F 9/24 463/43 |
| 2013/0163440 A1* | 6/2013 | Issakov | G01S 5/0221 370/246 |
| 2013/0279346 A1* | 10/2013 | Zhang | H04B 17/40 370/241.1 |

FOREIGN PATENT DOCUMENTS

| | | |
|---|---|---|
| CN | 102014486 A | 4/2011 |
| JP | 2001520388 A | 10/2001 |
| JP | 2011508873 A | 3/2011 |
| WO | 2011081999 A1 | 7/2011 |
| WO | 2011082002 A1 | 7/2011 |
| WO | 2012094774 A1 | 7/2012 |
| WO | 2013141771 A1 | 9/2013 |
| WO | 2014027941 A1 | 2/2014 |

OTHER PUBLICATIONS

Unknown, Author. "3rd Generation Partnership Project; Technical Specification Group Radio Access Network; Evolved Universal Terrestrial Radio Access (E-UTRA); Physical layer; Measurements (Release 11)." 3GPP TS 36.214 V11.0.0. Sep. 2012.
Siomina et al. "Enhancing Uplink Measurements for Positioning by Adaptively Using Multi-Antenna Systems." International Patent Application Serial No. PCT/SE2013/050496, filed May 3, 2013.
Unknown, Author, "[Draft] LS response on UL positioning parameters", Ericsson, TruePosition, Andrew Corp., 3GPP TSG-RAN WG1 Meeting #68bis, R1-121798, Jeju Island, Korea, Mar. 26-30, 2012, 1-2.
Unknown, Author, "Network Based Positioning Support—Change Request", TruePosition, 3GPP TSG-RAN WG2 Meeting #78, R2-122116, Prague, Czech Republic, May 21-25, 2012, 1-17.
Unknown, Author, "UTDOA positioning L1 parameters", TruePosition, 3GPP TSG RAN WG1 Meeting #68bis, R1-121035, Jeju, Korea, Mar. 26-30, 2012, 1-4.

* cited by examiner

METHODS OF POSITIONING IN A SYSTEM COMPRISING MEASURING NODES WITH MULTIPLE RECEIVING POINTS

RELATED APPLICATIONS

This application claims the benefit of and priority to U.S. Provisional Application Ser. No. 61/718,894, filed 26 Oct. 2012. The entire contents of said U.S. Provisional application are incorporated herein by reference.

TECHNICAL FIELD

The present disclosure relates generally to wireless communication networks and in particular to networks and devices performing positioning of devices based on measurements of radio transmissions.

BACKGROUND

The development of technologies to determine the position of a mobile device has enabled application developers and wireless network operators to provide location-based and location-aware services. Examples of these are guiding systems, shopping assistance, friend finder, presence services, community and communication services and other information services that give the mobile user information about his or her surroundings or that use this information to enhance their services.

In addition to the commercial services facilitated by these technologies, location-based emergency services are also being deployed. The governments in several countries have put specific requirements on the network operators to be able to determine the position of an emergency call. For instance, governmental requirements in the United States specify that mobile networks must be able to determine the position of a certain percentage of all emergency calls and further include accuracy requirements. The requirements make no distinctions between indoor and outdoor environments.

In many environments, the position can be accurately estimated by using positioning methods based on Global Navigation Satellite Systems (GNSS), such as the well-known Global Positioning System (GPS). However, GPS-based positioning may often have unsatisfactory performance, especially in urban and/or indoor environments.

Complementary positioning methods may also be provided by a wireless network to augment GPS technology. In addition to mobile terminal-based GNSS (including GPS), the following methods are currently available or will be soon be included in the Long-Term Evolution (LTE) standards developed by the $3^{rd}$-Generation Partnership Project (3GPP):
Cell ID (CID),
E-CID, including network-based angle-of-arrival (AoA),
Assisted-GNSS (A-GNSS), including Assisted-GPS (A-GPS), based on satellite signals,
Observed Time Difference of Arrival (OTDOA),
Uplink Time Difference of Arrival (UTDOA)—currently being standardized.

Several positioning techniques are based on time-difference-of-arrival (TDOA) or time-of-arrival (TOA) measurements. Examples include OTDOA, UTDOA, GNSS, and Assisted-GNSS (A-GNSS). A typical, though not the only, format for the positioning result with these techniques is an ellipsoid point with an uncertainty circle/ellipse/ellipsoid, which is the result of intersection of multiple hyperbolas/hyperbolic arcs (e.g., OTDOA or UTDOA) or circles/arcs (e.g., UTDOA, GNSS, or A-GNSS).

Several techniques, such as Adaptive Enhanced Cell Identity (AECID), may involve a mix of any of the methods above, and are thus regarded as "hybrid" positioning methods. With these methods, the position result can be almost any shape, but in many cases it is likely to be a polygon.

Cellular-based positioning methods (as opposed to satellite-based methods, for example) rely on knowledge of anchor nodes' locations, i.e., the fixed locations from which measured signals are transmitted (e.g., for OTDOA) or the fixed locations at which signals transmitted by mobile devices are measured (e.g., for UTDOA). These fixed locations may correspond, for example, to base station or beacon device locations for OTDOA, Location Measurement Unit (LMU) antenna locations for UTDOA, and base station locations for E-CID. The anchor nodes' locations may also be used to enhance AECID, hybrid positioning, etc.

Positioning Architecture

In 3GPP, location-based services are known as Location Services (LCS). Three key network elements in an LTE positioning architecture are the LCS Client, the LCS target and the LCS Server. The LCS Server is a physical or logical entity that manages positioning for a LCS target device by collecting measurements and other location information, assists the target device in measurements when necessary, and estimating the LCS target location. A LCS Client is a software-based and/or hardware entity that interacts with a LCS Server for the purpose of obtaining location information for one or more LCS targets, i.e., the entities being positioned. LCS Clients may reside in a network node, an external node (i.e., a network external to a cellular network), a Public Safety Access Point (PSAP), a user equipment (or "UE," in 3GPP terminology for an end-user wireless station), a radio base station (or "eNodeB," in LTE systems), etc. In some cases, the LCS Client may reside in the LCS target itself. An LCS Client (e.g., an external LCS Client) sends a request to LCS Server (e.g., a positioning node) to obtain location information. The LCS Server processes and services the received requests and sends the positioning result (sometimes including a velocity estimate) to the LCS Client.

In some cases, the position calculation is conducted by a positioning server, such as an Enhanced Serving Mobile Location Center (E-SMLC) or a Secure User-Plane Location (SUPL) Location Platform (SLP) in LTE. In other cases, the position calculation is carried out by the UE. The latter approach is known as the UE-based positioning mode, while the former approach includes both network-based positioning, i.e., position calculation in a network node based on measurements collected from network nodes such as LMUs or eNodeBs, and UE-assisted positioning, where the position calculation in the positioning network node is based on measurements received from UE.

LTE Positioning Protocol (LPP) is a positioning protocol for control plane signaling between a UE and an E-SMLC, which is used by the E-SMLC to provide assistance data to the UE and by the UE for reporting measurements to the E-SMLC. LPP has been designed in such a way that it can also be utilized outside the control plane domain such as in the user plane in the context of SUPL. LPP is currently used for downlink positioning.

LTE Positioning Protocol Annex (LPPa), sometimes referred to as LTE Positioning Protocol A, is a protocol between the eNodeB and the E-SMLC, and is specified only for control-plane positioning procedures, although it still can assist user-plane positioning by querying eNodeBs for information. For example, LPPa can be used to retrieve information such as positioning reference symbol (PRS) configuration in a cell for OTDOA positioning, or UE sounding reference signal (SRS) configuration for UTDOA positioning, and/or eNodeB measurements. LPPa may be used for downlink positioning and uplink positioning.

FIG. 1 illustrates the UTDOA architecture currently under discussion in 3GPP, including nodes found in the Radio Access Network (RAN) and the core network, as well as an external LCS Client. Although uplink (UL) measurements may in principle be performed by any radio network node, such as the illustrated LTE eNodeB 110, the UL positioning architecture also includes specific UL measurement units, known as Location Measurement Units (LMUs), which are logical and/or physical nodes that measure signals transmitted by a target UE, such as the UE 130 illustrated in FIG. 1. Several LMU deployment options are possible. For example, referring to FIG. 1, LMU 120a is integrated into eNodeB 110, while LMU 120b shares some equipment, e.g., at least antennas, with eNodeB 110. LMU 120c, on the other hand, is a standalone physical node comprising its own radio components and antenna(s).

While the UTDOA architecture is not finalized, there will likely be communication protocols established for communications between a LMU and positioning node, and there may be some enhancements to support UL positioning added to the existing LPPa or to similar protocols.

In LTE, UTDOA measurements, known as UL relative time-of-arrival (RTOA) measurements, are performed on Sounding Reference Signals (SRS). To detect an SRS signal, an LMU 120 needs a number of SRS parameters to generate an SRS sequence that is correlated against the received signal. These parameters are not necessarily known to LMU 120. Thus, to allow the LMU to generate the SRS sequence and detect the SRS signals transmitted by a UE, SRS parameters must be provided in the assistance data transmitted by the positioning node to LMU; these assistance data would be provided via SLmAP. However, these parameters may generally be not known to the positioning node, which needs then to obtain this information from eNodeB configuring the SRS to be transmitted by the UE and measured by LMU; this information (e.g., SRS transmit configuration or the updated SRS configuration) would have to be provided in LPPa.

Example parameters that may be signaled over LPPa from eNodeB to E-SMLC for UL/UTDOA positioning may comprise, e.g., those parameters illustrated in Table 1, below. Note that many of these parameters are described in the latest version of 3GPP document 3GPP TS 36.211, available at www.3gpp.org.

TABLE 1

| Category | Parameters |
|---|---|
| General | PCI of PCell |
| | UL-EARFCN of PCell |
| | Timing advance measurement for the UE in PCell |
| SRS | For each serving cell in which SRS is configured: |
| | PCI |
| | UL-EARFCN |
| | UL cyclic prefix |
| | UL system bandwidth of the cell |
| | Cell-specific SRS bandwidth configuration |
| | srs-BandwidthConfig |
| | UE-specific SRS bandwidth configuration srs-Bandwidth |
| | number of antenna ports for SRS transmission |
| | srs-AntennaPort |
| | frequency domain position |

TABLE 1-continued

| Category | Parameters |
|---|---|
| | SRS frequency hopping bandwidth configuration |
| | SRS-Cyclic shift |
| | Transmission comb |
| | SRS configuration index |
| | MaxUpPt, used for TDD only |
| | Group-hopping-enabled |
| | deltaSS, parameter $\Delta_{ss}$, included when SRS sequence hopping is used and not included otherwise |

Example parameters that may be signaled over SLmAP from E-SMLC to LMU(s) may comprise, e.g., those shown in Table 2, below. Again, many of these parameters are described in the latest version of 3GPP document 3GPP TS 36.211, available at www.3gpp.org.

TABLE 2

| Category | Parameters |
|---|---|
| General | Search window parameters: |
| | expected propagation delay, T, corresponding to distance between LMU and PCell, delay uncertainty $\Delta$ |
| SRS | For each serving cell in which SRS is configured and to be measured by LMU: |
| | PCI |
| | UL-EARFCN |
| | UL cyclic prefix |
| | UL system bandwidth of the cell |
| | Cell-specific SRS bandwidth configuration |
| | srs-BandwidthConfig |
| | UE-specific SRS bandwidth configuration srs-Bandwidth |
| | number of antenna ports for SRS transmission |
| | srs-AntennaPort |
| | frequency domain position |
| | SRS frequency hopping bandwidth configuration |
| | SRS-Cyclic shift |
| | Transmission comb |
| | SRS configuration index |
| | MaxUpPt, used for TDD only |
| | Group-hopping-enabled |
| | deltaSS, parameter $\Delta_{ss}$, included when SRS sequence hopping is used and not included otherwise |

Measurements for UL positioning and UTDOA are performed on UL transmissions, which may include, for example, reference signal transmissions or data channel transmissions. UL RTOA is the currently standardized UTDOA timing measurement, and may be performed on Sounding Reference Signals (SRS). The results of the measurements are signaled by the measuring node (e.g., LMU) to the positioning node (e.g., E-SMLC), e.g., over SLmAP.

FIG. 2 illustrates the current architecture under discussion in 3GPP for downlink (DL) positioning, again including nodes found in the Radio Access Network (RAN) and the core network, as well as an external LCS Client. It will be appreciated that this architecture includes many of the same components found in the UL positioning architecture illustrated in FIG. 1. Two additional components shown in FIG. 2, however, are the Serving Gateway (S-GW) and the Packet Data Network Gateway (PDN GW, or P-GW). These gateways terminate the UE's interfaces towards the E-UTRAN network and the Packet Data Network (PDN), respectively. LPP is currently used for downlink positioning. An LPP message may also include an LPP extension packet data unit (EPDU); Open Mobile Alliance (OMA) LPP Extensions, defined as LPPe, take advantage of this possibility. Currently, LPP and LPPe are used mainly for downlink positioning, while LPPa may be used both for DL and UL positioning.

Positioning Result

A positioning result is a result of processing of obtained measurements, including Cell IDs, power levels, received radio signal strengths or quality, etc. The positioning result is often based on radio measurements (e.g., timing measurements such as timing advance and RTT, or power-based measurements such as received signal strength, or direction measurements such as angle-of-arrival measurements) received from measuring radio nodes (e.g., UE or eNodeB or LMU).

The positioning result may be exchanged among nodes in one of several pre-defined formats. The signaled positioning result is represented in a pre-defined format, e.g., corresponding to one of the seven Universal Geographical Area Description (GAD) shapes.

Currently, a positioning result may be signaled between:
- an LCS target, e.g., a UE, and an LCS server, e.g., over LPP protocol;
- two positioning nodes, e.g., an E-SMLC or SLP, e.g., over a proprietary interface;
- a positioning server (such as an E-SMLC,) and other network nodes, e.g., a Mobility Management Entity (MME), a Mobile Switching Center (MSC), a Gateway Mobile Location Center (GMLC), an Operations and Maintenance (O&M) node, a Self-Organizing Network (SON) node, and/or a Minimization of Drive Tests (MDT) node;
- a positioning node and an LCS Client, e.g., between an E-SMLC and a Public Safety Access Point (PSAP), or between an SLP and an External LCS Client, or between an E-SMLC and a UE.

Note that in emergency positioning, the LCS Client may reside in a PSAP.

The result for UL positioning is based at least on one UL measurements. UL measurements may also be used for hybrid positioning. UL measurements may be used jointly with other measurements, to obtain the positioning result.

Uplink Positioning Measurements

As the name suggests, measurements for uplink positioning (e.g., UTDOA) are performed on uplink transmissions, which may comprise, e.g., one or more of physical signal or channel transmissions, e.g., reference signal transmissions, random access channel transmissions, Physical Uplink Control Channel (PUCCH) transmissions, or data channel transmissions. Some examples of reference signals transmitted in LTE UL are SRS and demodulation reference signals.

UL Relative Time of Arrival (RTOA) is a currently standardized UTDOA timing measurement. The measurement may be performed on Sounding Reference Signals (SRS), which may be configured for periodic transmissions, typically comprising multiple transmissions but may also be one transmission. SRS transmissions may be triggered by any of the two trigger types:

Trigger type 0: higher layer signaling from eNodeB,
Trigger type 1: via downlink control channel signaling (DCI formats 0/4/1A for FDD and TDD and DCI formats 2B/2C for TDD).

Other example uplink measurements are the uplink measurements specified in 3GPP TS 36.214. These measurements include measurements of received signal strength, received signal quality, angle-of-arrival (AoA), eNodeB receive-to-transmit (Rx-Tx) timing, relative time-of-arrival (RTOA), and other measurements performed by radio network nodes (e.g., eNodeB or LMU). Other known measurements are UL TDOA, UL TOA, UL propagation delay, etc.

Multi-Antenna Systems

A multi-antenna system may use one or more multi-antenna transmit and/or multi-antenna receive techniques, such as Single-User Multiple-Input Multiple-Output (SU-MIMO) or multi-user MIMO (MU-MIMO) techniques, transmit diversity, receive diversity, beam-forming, Antenna Array Systems as currently being standardized in 3GPP, multi-point communication (e.g., coordinated-multipoint, or CoMP), distributed antenna systems (DAS), etc. The antennas associated with a node may be, e.g., co-located, quasi-collocated (e.g., based on some channel properties such delay spread, etc.), or non-collocated.

A multi-antenna system may also deploy Remote Radio Units (RRUs) or Remote Radio Heads (RRHs). An RRU is a single unit in which only the RF front-end functionalities are implemented and which is connected to the remaining baseband processing part (Base Band Unit, or BBU) through a link (e.g., a fiber or wireless link). Depending on the functionality split, an RRU may also comprise some baseband functionality. RRU may also be referred to as a RRH.

A multi-antenna system may also comprise a multi-carrier system operating on multiple carrier frequencies or component carriers (CCs) and/or in different RF bands. The multi-carrier system may use carrier aggregation (CA), as described below, where different CCs may or may not be co-located.

Multi-Carrier or Carrier Aggregation Concept

To enhance peak rates within a technology, so-called multi-carrier or carrier aggregation solutions are known. Each carrier in multi-carrier or carrier aggregation system is generally termed as a component carrier, or sometimes referred to as a cell. In simple terms, the component carrier is an individual carrier in a multi-carrier system. The term carrier aggregation is also referred to with the terms (e.g., interchangeably called) "multi-carrier system", "multi-cell operation", "multi-carrier operation", "multi-carrier" transmission and/or reception. Carrier aggregation is used for transmission of signaling and data in the uplink and downlink directions. One of the component carriers is the primary component carrier (PCC) or simply primary carrier or even anchor carrier. The remaining ones are called secondary component carriers (SCCs) or simply secondary carriers or even supplementary carriers. Generally the primary or anchor component carrier carries the essential UE specific signaling. The primary component carrier exists in both uplink and downlink direction in carrier aggregation. The network may assign different primary carriers to different UEs operating in the same sector or cell.

With carrier aggregation, the UE has more than one serving cell in downlink and/or in the uplink: one primary serving cell and one or more secondary serving cells operating on the PCC and SCCs respectively. The serving cell is interchangeably called the primary cell (PCell) or primary serving cell (PSC). Similarly, the secondary serving cell is interchangeably called the secondary cell (SCell) or secondary serving cell (SSC). Regardless of the terminology, the PCell and SCell(s) enable the UE to receive and/or transmit data. More specifically the PCell and SCell exist in downlink and uplink for the reception and transmission of data by the UE. The remaining non-serving cells are called neighbor cells.

Component carriers belonging to the CA may belong to the same frequency band (intra-band carrier aggregation) or to different frequency bands (inter-band carrier aggregation) or any combination thereof (e.g., two component carriers in band A and one component carrier in band B). Furthermore, the component carriers in intra-band carrier aggregation may be adjacent or non-adjacent in the frequency domain (intra-band, non-adjacent carrier aggregation). A hybrid carrier aggregation comprising any two of intra-band adjacent, intra-band non-adjacent and inter-band aggregations is also possible. Using carrier aggregation between carriers of different technologies is also referred to as "multi-RAT carrier aggregation" or "multi-RAT-multi-carrier system" or simply "inter-RAT carrier aggregation". For example, carriers from WCDMA and LTE may be aggregated. Another example is the aggregation of carriers from LTE Frequency-Division Duplex (FDD) and LTE Time-Division Duplexing (TDD) modes, which may also be interchangeably called as multi-duplex carrier aggregation system. Yet another example is the aggregation of LTE and CDMA2000 carriers. For the sake of clarity, carrier aggregation within the same technology as described can be regarded as 'intra-RAT' or simply 'single RAT' carrier aggregation.

The component carriers in carrier aggregation may or may not be co-located in the same site or radio network node (e.g., a radio base station, relay, mobile relay, etc.). For instance, the component carriers may originate at different locations (e.g., from non-co-located base stations, or from base stations and a remote radio head (RRH), or at remote radio units (RRUs)). Well-known examples of combined carrier aggregation and multi-point communication techniques include the Distributed Antenna System (DAS), the Remote Radio Head (RRH), the Remote Radio Unit (RRU), and Coordinated Multipoint (CoMP) transmission. The techniques described herein also apply to multi-point carrier aggregation systems as well as to multi-point systems without carrier aggregation. The multi-carrier operation may also be used in conjunction with multi-antenna transmission. For example signals on each component carrier may be transmitted by the eNodeB to the UE over two or more antennas.

The wide variety of deployments and multi-antenna schemes complicate the selection of and configuration of positioning measurements. Accordingly, improved techniques for selecting and configuring measurement nodes for positioning are needed.

SUMMARY

Particular implementations of the solutions detailed herein may address several problems that occur in certain systems in which a measuring node is associated with multiple antennas. In such systems, it may not be straightforward, e.g., how to select and how to configure the set of receiving antennas suitable for performing UL measurements for a given wireless device. In particular, when multiple receive points are associated with an LMU, it may not be straightforward:

how to select LMU in the positioning node for a UE,
which receive point (e.g., antenna, antenna port, RRH, etc.) to use for performing measurements on UL radio signals transmitted by a UE.

Disclosed in detail below are a variety of techniques that include the following (which may also be combined with each other):

methods of deploying measuring nodes with multiple receiving points;
methods for determining receiving points for performing UL measurement;
search window adjustment in deployments with measuring nodes associated with multiple receiving points; and
methods of managing measurements in deployments with measuring nodes with multiple receiving points.

An example method, as implemented by a network node, is for controlling measurements of radio signals transmitted by a wireless device, where the measurements are performed by a measuring node associated with two or more receiving points. This example method begins with obtaining a receiving point configuration for at least one measuring node associated with two or more receiving points, and continues with selecting one or more receiving points for performing measurements, based on the obtained configuration. The selected receiving points are then configured for performing the measurements. In some embodiments, this example method may further comprise receiving measurements from the at least one measuring node. In some embodiments, the selected receiving points comprise a subset of two or more receiving points associated with the same measuring node. The selected receiving points may be associated with the same or different locations.

A related method, suitable for implementation in a measuring node adapted to measure radio signals transmitted by a wireless device, begins with obtaining receiving point configuration for two or more non-colocated receiving points associated with the measuring node. The method continues with performing at least one measurement using the obtained configuration. In some embodiments, this example method continues with sending the measurement to another node, e.g., to a positioning node. In some embodiments, performing the at least measurement comprises selectively performing the measurement. In several embodiments, the obtaining of the receiving point configuration comprises receiving the receiving point configuration from another node. In these or in any other embodiment, the receiving point configuration may comprise any one or more of: a receiver radio-frequency (RF) characteristic; a frequency or frequency range; a receive bandwidth; a radio frequency (RF) configuration parameter; an antenna configuration; an antenna pattern configuration; an antenna polarization configuration; a radio beam configuration; an antenna array configuration; a receiver type; a received signal measurement reference point; and parameters associated with the location or installation of the receiving point.

Another related method, also suitable for implementation in a measurement node adapted to measure radio signals transmitted by a wireless device, begins with receiving search window information for performing measurements of radio signals from a wireless device. The method continues with performing measurements for at least two receiving points associated with the measurement node, using at least two different search windows, based on the search window information. In some embodiments, the search window information comprises a common reference search window, in which case the method may further comprise adjusting the reference search window to obtain the search window for at least measurements associated with one of the receiving points. In some of these embodiments, the common reference search window is based on a location for the measurement node, and adjusting the reference search window is based on the receiving point location. In some embodiments, receiving search window information comprises receiving search window parameters for each of the at least two receiving points, and the method further comprises determining the search window for each of the at least two receiving points based on the received search window parameters. In some methods, search windows for the at least two receiving points are based on one or more mobility parameters for the wireless device.

Yet another related method, this one suitable for implementation in a first network node, begins with obtaining measurements for two or more receiving points associated with one or more measuring nodes, wherein at least one of the measuring nodes is associated with two or more of the receiving points. Next, measurement identifiers are assigned to the measurements, based on a rule relating measurements and receiving points, where each measurement identifier corresponds to one or more receiving points. Finally, the measurements and the corresponding measurement identifiers are forwarded to a second network node. In some embodiments, the method may further comprise first receiving a measurement request, the measurement request identifying the two or more receiving points using corresponding measurement identifiers.

Apparatus configured to carry out one or more of the methods summarized above and/or variants thereof are also described in detail below. These apparatus include measurement nodes and other network nodes. Of course, the present invention is not limited to the above-summarized methods, apparatus, features, and advantages. Indeed, those skilled in the art will recognize additional features and advantages upon reading the following detailed description, and upon viewing the accompanying drawings.

DETAILED DESCRIPTION

Figure 1:
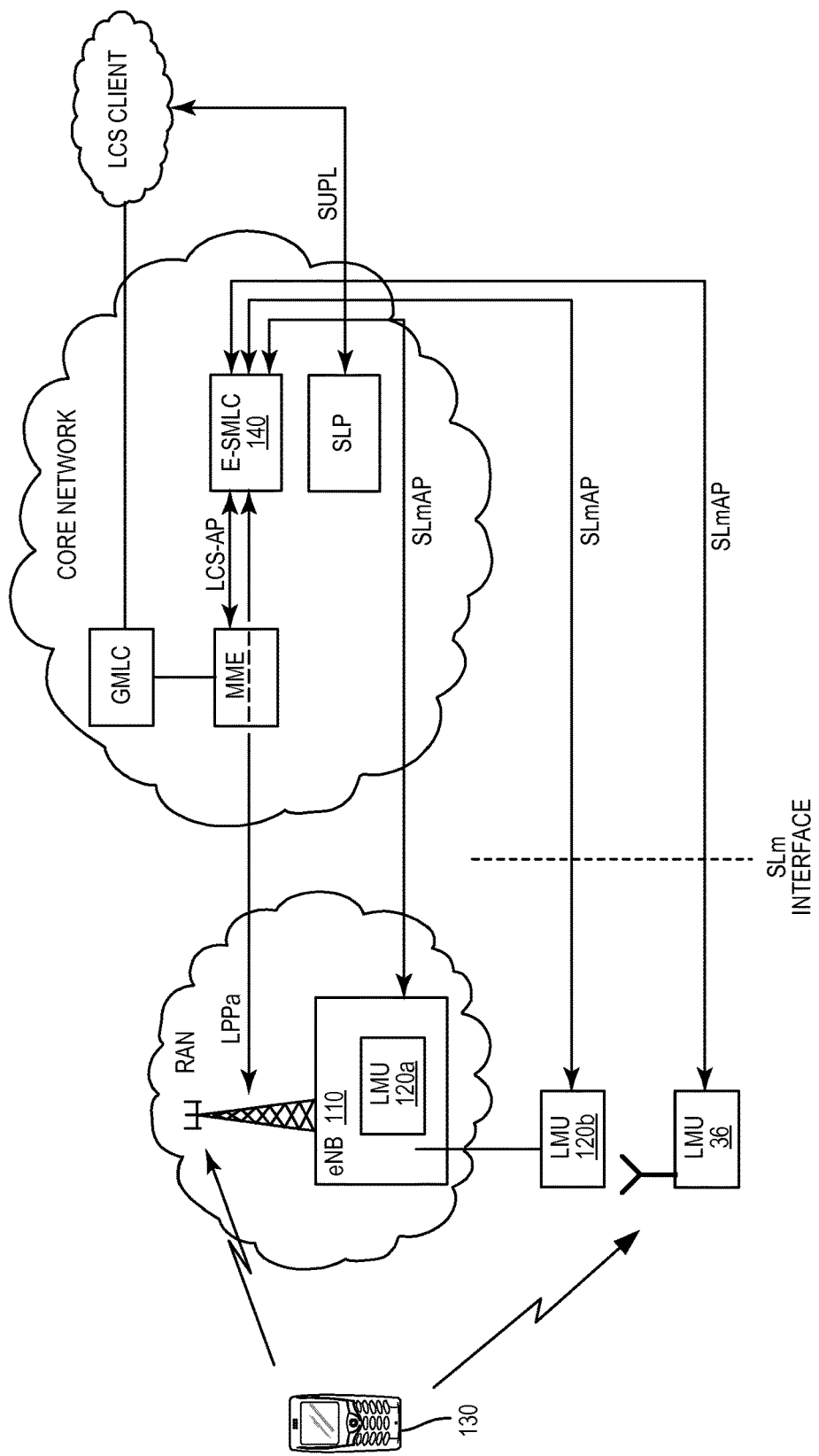
FIG. 1 illustrates several nodes in an example network configured according to the LTE positioning architecture for uplink positioning.
Figure 2:
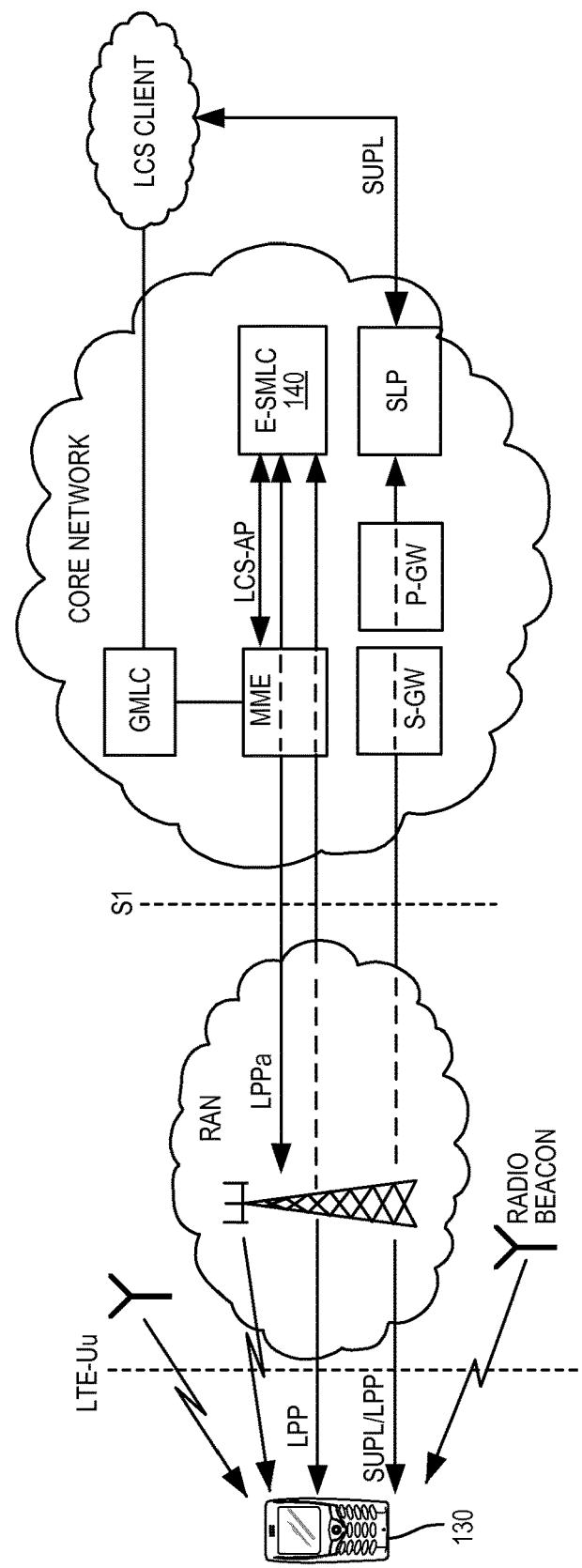
FIG. 2 illustrates several nodes in an example network configured according to the LTE positioning architecture for downlink positioning.

While terminology from 3GPP LTE is used in this disclosure to exemplify the invention, this should not be seen as limiting the scope of the invention to LTE systems or systems using the LTE Radio Access Technology (RAT). Other wireless systems, including those based on WCDMA, WiMAX, UMB and GSM, may also benefit from exploiting the ideas covered within this disclosure. Furthermore, the inventive techniques disclosed herein are not limited to single-RAT systems, but may also be applied in the multi-RAT context. Some other RAT examples are LTE-Advanced, UMTS, HSPA, GSM, cdma2000, WiMAX, and WiFi. The embodiments described herein apply also for single-carrier, multi-carrier, and carrier-aggregation networks.

Still further, the techniques and apparatus described herein may be considered as standalone embodiments or may be used in any combination with each other, unless their descriptions herein clearly indicate otherwise.

The terms "wireless device" and "UE" are used interchangeably in the description that follows. A UE may comprise any device equipped with a radio interface and capable of at least generating and transmitting a radio signal to a radio network node. Note that some radio network nodes, e.g., a femto base station, or "home base station," and LMUs, may be equipped with a UE-like interface, and in some cases may need to be positioned in the same manner as UEs are positioned. Examples of UEs that are to be understood in a general sense are wireless PDAs, wireless-equipped laptop computers, mobile telephones, wireless sensors, fixed relay nodes, mobile relay nodes, and any radio network node equipped with a UE-like interface (e.g., small RBS, eNodeB, femto BS).

A "radio node" is characterized by its ability to transmit and/or receive radio signals, and comprises at least a transmitting or receiving antenna. A radio node may be a UE or a radio network node. Some examples of radio nodes are a radio base station (e.g., eNodeB in LTE or NodeB in UTRAN), a relay, a mobile relay, a remote radio unit (RRU), a remote radio head (RRH), a wireless sensor, a beacon device, a measurement unit capable of transmitting downlink signals (e.g., LMUs), a user terminal, a wireless PDA, a mobile telephone, a smartphone, a wireless-equipped laptop, etc.

A "radio network node" is a radio node in a radio communications network and is typically characterized by having its own network address. For example, a mobile device in a cellular network may have no network address, but a wireless device involved in an ad hoc network is likely to have a network address. A radio node may be capable of operating or receiving radio signals or transmitting radio signals in one or more frequencies, and may operate in single-RAT, multi-RAT or multi-standard mode (for example, a dual-mode user equipment may operate with any one or combination of WiFi and LTE or HSPA and LTE/LTE-A). A radio network node, including eNodeB, RRH, RRU, LMU, or transmitting-only/receiving-only nodes, may or may not create own cell. It may also share a cell with another radio node which creates own cell. More than one cell may be associated with one radio node. Further, one or more serving cells (in DL and/or UL) may be configured for a UE, e.g., in a carrier aggregation system where a UE may have one Primary Cell (PCell) and one or more Secondary Cells (SCells). A cell may also be a virtual cell, e.g., characterized by a cell ID but not providing a full cell-like service, associated with a transmit node.

A "network node" may be a radio network node or a core network node. Some non-limiting examples of a network node are an eNodeB, a Radio Network Controller (RNC), a positioning node, an MME, a PSAP, a SON node, an MDT node, and an O&M node. A "coordinating node," as described below, may be but is not necessarily a network node.

A "positioning node" as described in several embodiments herein is a node that has positioning functionality. For example, for LTE it may be understood as a positioning platform in the user plane (e.g., SLP in LTE) or a positioning node in the control plane (e.g., E-SMLC in LTE). An SLP may also consist of a SUPL Location Center (SLC) and a SUPL Positioning Center (SPC), where the SPC may also have a proprietary interface with E-SMLC. Positioning functionality may also be split among two or more nodes. For example, there may be a gateway node between LMUs and E-SMLC, where the gateway node may be a radio base station or another network node; in this case, the term "positioning node" may relate to E-SMLC and the gateway node. In a testing environment, a positioning node may be simulated or emulated by test equipment. The term "positioning node" may also be used, at least in some embodiments, interchangeably with the term "positioning server". A positioning server or positioning node may also be configured in a wireless device, e.g., it may or may not be a network node.

A "measuring node" is a radio node performing positioning measurements, and may be a wireless device or a radio network node (e.g., an LMU or eNodeB). Downlink measurements are typically measurements performed by a wireless device on at least signals/channels transmitted by one radio network node. Uplink measurements are typically measurements performed by a radio network node on at least signals/channels transmitted by one or more wireless devices. There are also measurements that include both uplink and downlink measurement components, e.g., Rx-Tx or RTT. In some uplink measurements, typically, the measurement is performed by a radio network node on signals/channels transmitted by wireless device as well as by the network node itself. Some examples of uplink positioning measurements, or radio measurements that may be used for positioning, are timing measurements (e.g., TDOA, TOA, timing advance Type 1 and timing advance Type 2, RTT measured by a radio network node, UL RTOA defined for UTDOA, UL propagation delay, etc.), angle measurements (e.g., AoA), received signal strength and received signal quality measurements. Some of these measurements are defined in 3GPP TS 36.214, the latest version of which may be found at www.3gpp.org. Uplink measurements may also include measurements that have at least one uplink measurement component, e.g., the uplink measurement component of a two-directional measurement. An example network node that may be used to implement a measuring node in certain networks providing the proposed solution is described in greater detail below.

The term "coordinating node" as used herein is a network and/or node that coordinates radio resources among one or more radio nodes. Examples of a coordinating node are a network monitoring and configuration node, an OSS node, an O&M node, an MDT node, a SON node, a positioning node, an MME, a gateway node such as Packet Data Network Gateway (P-GW) or Serving Gateway (S-GW) network node or femto gateway node, a macro node coordinating smaller radio nodes associated with it, an eNodeB coordinating resources with other eNodeBs, etc. An example network node that may be used to implement a coordinating node in certain networks providing the proposed solution is described in greater detail below.

The signaling described below in connection with various embodiments of the invention is either via direct links or logical links (e.g., via higher layer protocols and/or via one or more network and/or radio nodes). For example, signaling from a coordinating node may pass through another network node, e.g., a radio network node.

The term "subframe" as used in the description herein (typically related to LTE) is an example resource in the time domain, and in general it may be any pre-defined time instance or time period. The term "measurement" as used herein may refer to a measurement process or to the result of that measurement process. In some cases, the term "measurement value" is used to refer to the result of a measurement process. Similarly, the term "compensation" may refer to a compensating process or to a value used in compensating some other value, i.e., a "compensation value."

For the purposes of providing background and description of related techniques and apparatus, International Patent Application Serial No. PCT/SE2012/051364, filed 10 Dec. 2012, and International Patent Application Serial No. PCT/SE2013/050496, filed 3 May 2013, are each incorporated herein by reference in their entirety. Additionally, the 3GPP standard documents 3GPP TS 36.211, "Evolved Universal Terrestrial Radio Access (E-UTRA); Physical Channels and Modulation," V11.0.0, September 2012 and 3GPP TS 36.214, "Evolved Universal Terrestrial Radio Access (E-UTRA); Physical Layer; Measurements," V11.0.0, September 2012 are both incorporated by reference in their entirety, again for the purpose of providing background and context for the present disclosure, and in particular for the purposes of defining many of the signal names, parameter names, and the like, as used herein.

Measuring Node Selection for UL Positioning

In UL/UTDOA positioning, E-SMLC selects assisting radio network nodes (e.g., LMUs in LTE) that will perform radio measurements on UL radio signals transmitted by the UE. The selected measuring nodes are provided (e.g., over SLmAP) with the assistance data necessary for the measuring nodes to configure and perform the measurements, where the assistance data may comprise general data and the configuration of the transmitted UL radio signal. When the UL radio signal configuration changes during the on-going measurement reporting transaction between the E-SMLC and LMU, the E-SMLC may send the updated configuration to the measuring node.

The positioning node receives the LMU information, which may also include the LMU location information, e.g., from LMU or an O&M node. Hence, the LMU selection may be based, e.g., on the LMU location information. However, the LMU location may or may not accurately reflect the location of the receiving antenna, e.g., when the antenna is remote from the measuring node. Further, an LMU may be associated with multiple antennas, which, again, may or may not have exactly the same location as LMU and which may or may not even be co-located with each other, or which may have different coverage or serving areas (e.g., an LMU integrated into eNodeB with multi-sector and/or distributed antennas).

Particular implementations of the solutions detailed herein may address several problems that occur in certain systems in which a measuring node is associated with multiple antennas. In such systems, it may not be straightforward, e.g., how to select and how to configure the set of receiving antennas suitable for performing UL measurements for a given wireless device.

In particular, when multiple receive points are associated with an LMU, it may not be straightforward:
  how to select an LMU in the positioning node for a UE, which receive point (e.g., antenna, antenna port, RRH, etc.) to use for performing measurements on UL radio signals transmitted by a UE.

In the discussion that follows, several related techniques are discussed. For convenience, these are categorized into several groups, designated "Group 1," "Group 2," etc. While these categorizations are useful for the purposes of describing the techniques, it should be understood that techniques from different categories may be combined and used with one another, unless the discussion below or the specifics of the techniques clearly indicate otherwise. Likewise, it should be understood that when variations of a given technique are described in the following discussion, the same or similar variations can generally be applied to similar or related techniques, whether or not those similar or related techniques fall in the same descriptive category used below.

Group 1 Techniques: Methods of Deploying Measuring Nodes with Multiple Receiving Points According to several techniques in this category, a first node (e.g., a measuring node, LMU, eNodeB, positioning node, SON, coordinating node, or O&M node) obtains a receiving point configuration for performing, by a measuring node, at least one UL measurement for positioning a wireless device. These techniques are particularly relevant when, for example, multiple receiving points may be associated with the measuring node (e.g., LMU, eNodeB, AP). Note that as used herein, the term "receiving point" may refer to any one or more of:

- a receiving antenna;
- a receiving antenna element;
- a receiving antenna port (physical or logical) or receiver port;
- a receiving antenna panel;
- an antenna system;
- an antenna array;
- an element receiving a radio signal in a DAS;
- a receiving point in a CoMP system;
- a point receiving a radio wave transmitted by the wireless device;
- a network element associated with receiving the radio signal;
- a radio network node (e.g., eNodeB, RBS, WLAN access point, relay, femto BS, RRH, RRU, etc.) or another wireless device receiving the radio signal (e.g., in a multi-hop radio network)'
- a receiving chain of network elements or node elements via which the received radio signal characteristics are delivered to the radio signal processing unit;
- a reference point for the received signal measurement; and
- a location or an installation point associated with receiving the radio signal.

In particular embodiments, the obtained receiving point configuration may be received from another node, read from memory (e.g., a local memory element accessible by the first node), and/or obtained by the first node in any other suitable manner. Thus, in certain embodiments, obtaining the receiving point configuration may, for example, involve the first node receiving a receiving point configuration from a second node or retrieving a stored receiving point configuration from memory. Obtaining the receiving point configuration may include, for example, obtaining one or a set of the receiving points (or their identifiers) to be used for performing the UL measurements. Obtaining the set of receiving points may comprise obtaining the set of all receiving points that are associated with a measuring node (e.g., for any wireless device or a specific type of wireless devices), or a selected one or more receiving points from the set of all available receiving points. There may also be a measuring node capability indicating whether the measuring node is capable of supporting more than one receiving point, and the capability may be signaled to another node (e.g., to the positioning node) upon an event, triggering condition, or a request from this node. Depending on this capability, the other node may, for example, accordingly select a subset of the receiving points relevant for a specific positioning session or may decide Measurement IDs. In some embodiments of the presently disclosed techniques, obtaining a set of receiving points may comprise obtaining the number of receiving points associated with a measuring node and/or obtaining identifications of the receiving points in the set.

Obtaining the receiving point configuration may alternatively or additionally include, for example, obtaining one or more of configuration parameters associated with a receiving point, where the parameters determine at least one received radio signal characteristics or characteristic of the channel over which the signal is received (e.g., phase, amplitude, received power, received energy, received signal quality, propagation delay or timing of the received signal, propagation path, multipath profile, etc.). Some examples of the receiving point configuration parameters are:

- receiver RF characteristic (e.g., such as is defined in the 3GPP document 3GPP TS 36.104, available at www.3gpp.org);
- frequency or frequency range;
- receive bandwidth;
- radio frequency (RF) configuration parameter, e.g., a parameter associated with receiver sensitivity, signal splitting, amplification, isolation, etc.;
- antenna configuration (e.g., mechanical tilt, electrical tilt, azimuth, antenna gain);
- antenna pattern configuration;
- antenna polarization configuration;
- radio beam configuration (e.g., gain, width, horizontal direction, vertical direction, multi-beam configuration);
- antenna array configuration;
- receiver type (e.g., depending on how weak the signal is expected to be, whether interference handling such as interference cancellation/suppression/rejection is needed or not, etc.);
- received signal measurement reference point (e.g., whether the reference point is configurable); and
- parameters associated with the location or installation of the receiving point (e.g., a height that may be adjustable).

In some embodiments, the obtaining of a set of the receiving points (or their identifiers) to be used for performing the UL measurements and the obtaining of one or more of configuration parameters associated with a receiving point may both be performed. In some cases, these may be performed in two (or more) steps, by a single or multiple nodes. In some embodiments, the result of the first obtaining may be stored and/or signaled to a different node implementing the second obtaining operation.

A radio signal transmitted by the wireless device being positioned is received by one or more of the receiving points, after which the received radio signal and/or received radio signal characteristics are shared with/communicated to the measuring node (e.g., via one or more radio links and/or cables; directly or via another node or unit, e.g., via a gateway or Antenna Sharing Unit, ASU). The measuring node then performs one or more UL measurements based at least on the received radio signal and/or its characteristics.

Figure 3A:
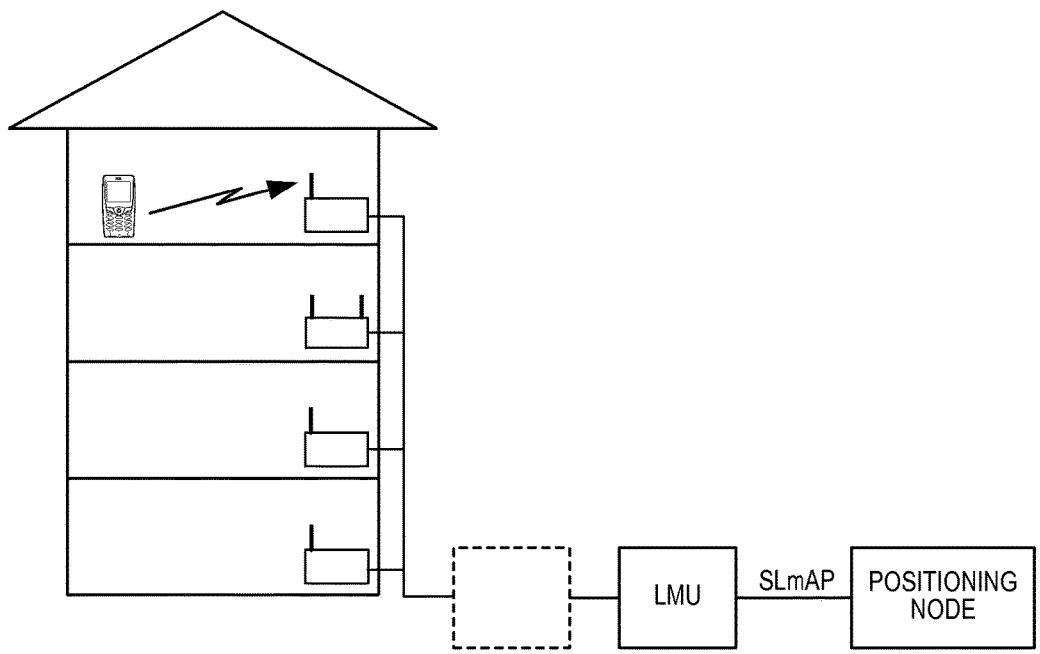
FIGS. 3A, 3B, 3C, and 3D illustrate various network deployment options for a measuring node associated with multiple receiving points.
Figure 3B:
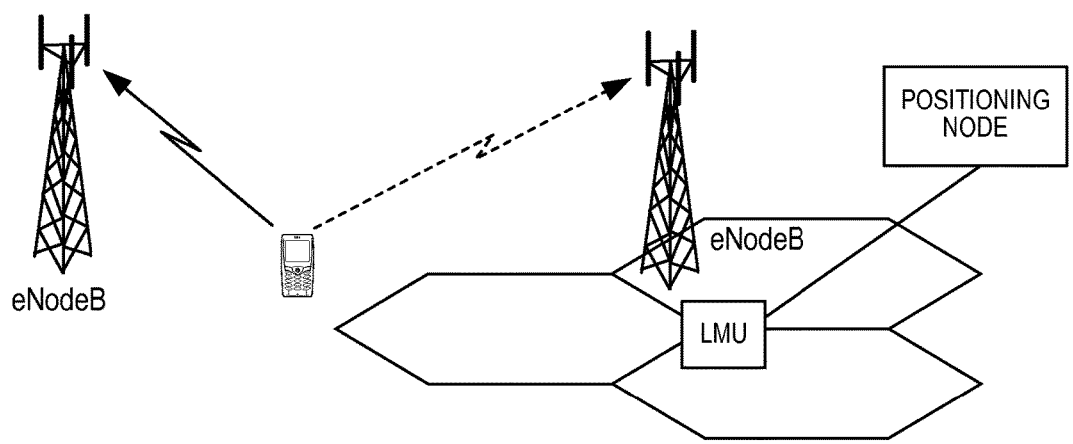

Some examples of network deployments comprising a measuring node associated with multiple receiving points are illustrated in FIGS. 3A, 3B, 3C, and 3D. FIG. 3A illustrates an indoor system with distributed antennas, or an indoor system with wireless local-area network (WLAN) access points. The multiple antennas or access points provide multiple receiving points that are connected to a measuring node (e.g., an LMU), either directly, or through one or more other nodes. In the example deployment shown in FIG. 3B, a measuring node (e.g., an LMU) is co-sited with an eNodeB or integrated into an eNodeB, which has a three-sectored antenna system with directional antennas. Thus, three receiving points (the three sectors of the antenna) are associated with a single measuring node. As can be seen in FIG. 3B, a UE that is being positioned may be served by another eNodeB, in addition to or instead of the one taking the measurements.

Figure 3C:
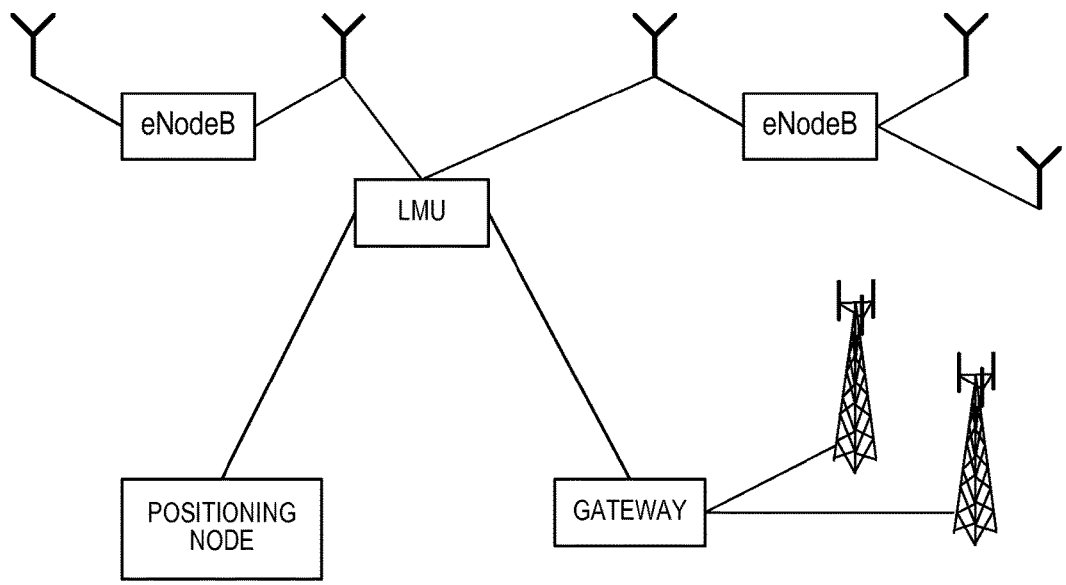
Figure 3D:
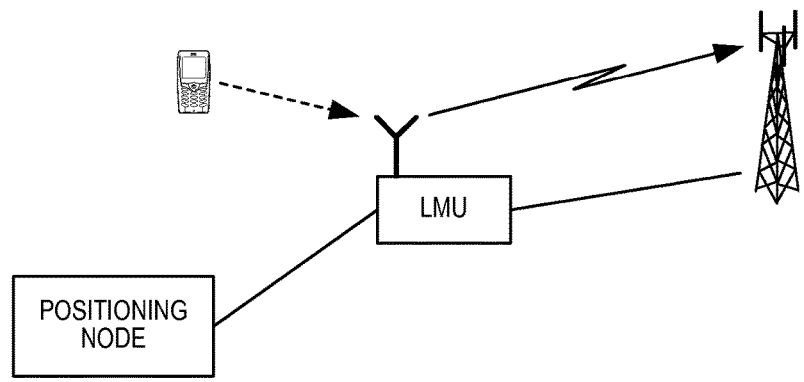
Figure 4A:
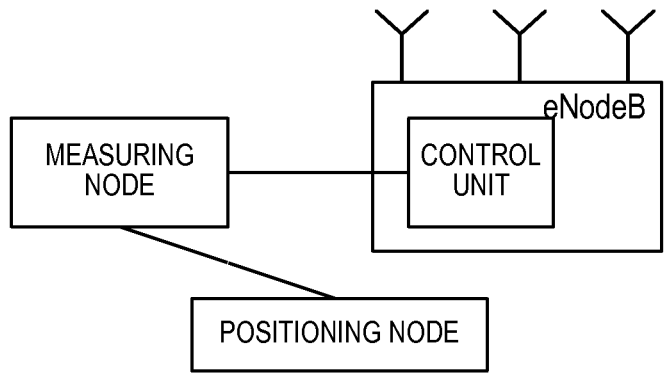
FIGS. 4A, 4B, 4C, 4D, and 4E illustrate examples of control units controlling multiple receiving point configurations.
Figure 4B:
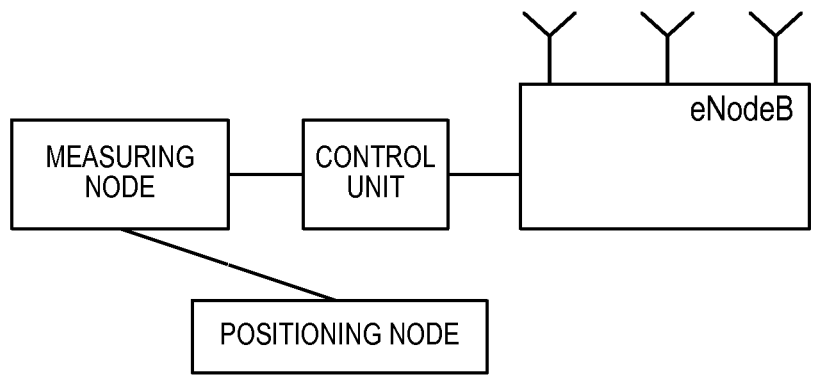
Figure 4C:
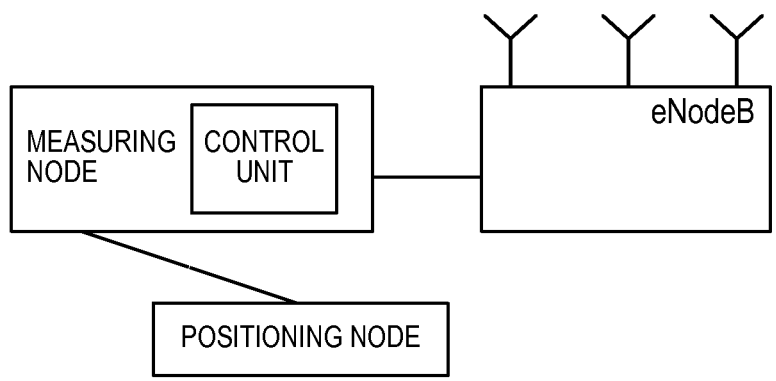
Figure 4D:
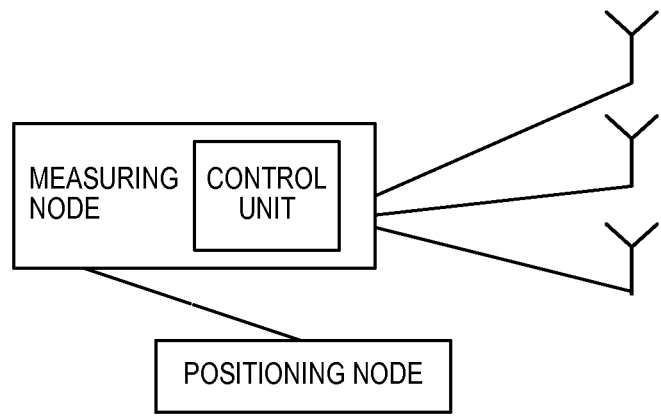
Figure 4E:
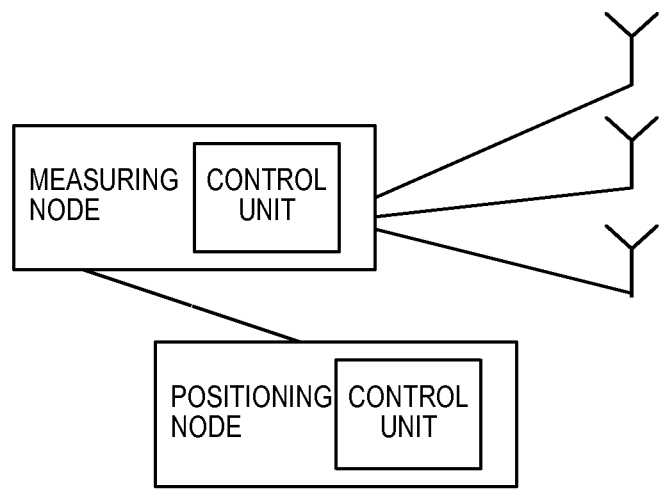

In FIG. 3C, a measuring node (e.g., an LMU) is sharing antennas with multiple radio base stations (eNodeBs), and is also connected to some radio base stations via a gateway. Finally, in FIG. 3D, a standalone measuring node (e.g., an LMU) has its own antenna, but is also connected to another eNode with which it is sharing antennas as well.

As can be seen from these figures, when a measuring node is associated with multiple receive points (or, interchangeably, multiple receive points are associated with a measuring node) it may not be optimal to always use all the associated receive points for performing UL measurements for a given UE.

A receiving point configuration for a plurality of receiving points may be obtained and/or used by any of several nodes. Example operations that may be carried out in a node include obtaining the receiving point configuration, e.g., any one or more of:

- determining, calculating, identifying, or selecting from a determined set, e.g., based on the result of an earlier obtaining of a set of available receiver points, or from a pre-defined set;
- deciding which receiving points to use or their configurations based on one or more input parameters or conditions;
- acquiring the receiving point configuration (e.g., from internal or external memory, a table, a database, in response to requesting from another node, such as a positioning node, O&M node, etc.);
- receiving the receiving point configuration from another node.

Other example operations include using the obtained receiving point configuration, e.g., any one or more of:

- selecting the receiving points and/or the measuring nodes for an uplink measurement, based on the obtained receiving point configuration. In one example, the set of measuring nodes is selected prior to obtaining the receiving point configuration and/or prior selecting the receiving points. In another example, the set of measuring nodes (e.g., assisting LMUs for a certain UE) is selected after obtaining the receiving point configuration and/or after selecting the receiving points.
- sending data based on the receiving point configuration to at least one second node (e.g., a measuring node, a node controlling receiving point configuration such as eNodeB or DAS management node, another positioning node, a SON node, a MDT node, an O&M node). The data may be assistance data, e.g., comprising uplink transmit signal configuration, sent to the measuring node, for example. The data may be the set of the determined receiving points associated with an area (e.g., serving cell, cell sector, etc.) of the wireless device's approximate location; these data may be sent from the serving eNodeB to the positioning node (e.g., via LPPa), for example, together with the SRS transmit signal configuration for the wireless device. The data, which may be used the node that receives the data to perform uplink measurements or to configure radio equipment, may comprise the determined receiving point configuration, e.g., the set of determined receiving points and/or configuration parameter(s) for the determined receiving point(s), which may be associated with one or more measuring nodes. For example, a positioning node may signal the data to an LMU (e.g., via SLmAP), or a positioning node may signal the data to an eNodeB (e.g., over LPPa) that is sharing antennas with LMUs.
- configuring the determined receiving points for receiving radio signals transmitted by a wireless device to be positioned. For example, the relevant node may configure the receiving points by setting one or more parameters of a receiving point configuration for the relevant receiving points (e.g., by transmitting information indicative of the configuration parameter(s) to the receiving points, or to a measuring node or other node associated with those receiving points) to facilitate receipt and/or processing of the radio signals to be transmitted by the wireless device in question.
- obtaining and/or using the received radio signal, received radio signal characteristics or samples selectively (e.g., in the measuring node) only from the receiving points comprised in the determined set of the receiving points and using them in a processing unit for obtaining the uplink measurements.
- using uplink measurements selectively (e.g., in the measuring node or positioning node), e.g., only from the receiving points comprised in the determined set of the receiving points, and using them for position calculation for the wireless device.

The obtained receiving point configuration may also be stored, e.g., in a database or internal or external memory, and used later for positioning (e.g., for positioning of other wireless device) or for other purposes, such as Radio Resource Management (RRM), Self-Organizing Network (SON) management, minimization of drive testing (MDT), network management, cell planning or optimization.

The functionality above may be implemented in one or more control units, e.g., as depicted in FIGS. 4A-4E, which illustrate examples of control units controlling multiple receiving point configurations. These control units may implement one or more of the steps above. They may represent a functional block, a processor configured with appropriate software, a hardware unit, or a mix of software-based and hardware-based processing. In some examples, the control block may comprise an Antenna Sharing Unit (ASU) used for co-siting LMU and RBS solutions. In particular embodiments, this control unit may represent a processor (e.g., a general processor, digital signal processor (DSP), application specific integrated circuit (ASIC)) or other electronic circuitry configured to perform the described functionality. The physical components of the control unit may be located in a single node or may be distributed over multiple nodes of the network.

Group 2 Techniques: Methods for Determining Receiving Points for Performing Uplink Measurements Various techniques described below may be used to determine, i.e., identify or select, the particular receiving points to be used for performing one or more uplink measurements. Determining one or a set of receiving points for performing uplink measurements may be based, e.g., on:

- a pre-defined rule (e.g., one receiving point from one location or per small area);
- a pre-configured or dynamically configured relation structures (see Approach 1, described below);
- measurement performance statistics (see Approach 2, described below);
- positioning performance statistics (see Approach 3, described below); or
- any combination of the above.

Depending on the positioning method and positioning measurement type, one or more receiving points may be involved in the uplink measurements.

Approach 1: Determining Based on Serving Cell Information

The serving node or serving cell for a mobile terminal (UE, in 3GPP terminology) is typically known when positioning session starts. This knowledge may be exploited for determining the set of receiving points.

According to this approach, to determine a set of receiving points, a node (which may be the same node that obtained a set of receiving points according to the Group 1 techniques described above) may use a relationship between the serving node or cell identification of the wireless device being positioned and a list of associated receiving points. The list may be in an order of preference, for example, or with assigned priorities for the receiving points. The order of preference or priorities may be exploited when fewer receiving points may be necessary for positioning some wireless device. Thus, for example, the N "best" receiving points (e.g., the first N receiving points in the list) may be selected. The list and receiving point priorities may also depend, for example, on the type of wireless device to be positioned, which may be different, e.g., depending on the wireless device transmission capability. Thus, for example, the list of selected or candidate receiving points may be longer for wireless devices having a maximum output power of 33 dBm than for wireless devices having a maximum output power of 23 dBm. As another example, the list and receiving point priorities may depend on the target positioning QoS (e.g., uncertainty and confidence)

The relationship between the serving node or cell identification of the wireless device being positioned and the list of associated receiving points may have any of a variety of structures or forms, such as a table or set of lists (e.g., one list for each serving cell/node). The relationship structures may be different for different positioning measurement type or positioning methods.

The node may build and maintain the relationships, e.g., adding or removing receiving points from a list associated with a cell. Adding or removing receiving points from a particular relationship may be based on any of several reasons, such as based on measurement quality statistics (see Approach 2, below) or positioning accuracy (see Approach 3, below). The node may obtain from another node (e.g., a neighbor node, an MME, an O&M node, a SON node, a positioning node, etc.) the list of receiving points for at least one cell/node, or may acquire the relationships from an internal or external database, memory, computer readable medium, etc. In some embodiments, the node may signal the relationship(s) to another node, e.g., via X2, LPPa, SLmAP, etc.

Approach 2: Determining Based on Measurement Performance Statistics

According to this embodiment, a node (which may be the same node that obtained a set of receiving points according to the Group 1 techniques described above) uses measurement performance statistics to determine the receiving point(s) to be used for the UL measurement, while taking into account information indicative of an approximate location of the wireless device being positioned, e.g., any one or more of:

a serving or neighbor radio network node or cell identification (e.g., serving cell ECGI or serving cell PCI and EARFCN)

a geographical area indication (e.g., street, area name, floor, or area index)

a logical area indication (e.g., local area identification, tracking area, cell or sector)

The statistics may be obtained from another node, acquired from a database, internal or external memory or computer readable medium. These measurement performance statistics may represent any suitable information indicating a quality of the relevant measurement, or any other suitable indication of how well the measurement was performed. For example, in particular embodiments, the measurement performance statistics may represent a UL RTOA measurement quality metric indicating a quality of certain associated UL RTOA measurements based on a standard deviation of the measurements.

When there are not sufficient statistics, all receiving points associated with a measuring node may be selected for the uplink measurements, in some embodiments. The measurement performance statistic (e.g., UL RTOA measurement quality metric) may then be stored in a database, with or without statistical processing (e.g., grouping, averaging, etc.). An example record in the database may be formatted, for example, as follows:

<receiving point ID; UL measurement quality; serving cell ECGI; [other parameters]>.

Other parameters may further detail the wireless device location, e.g., any one or more of:

a distance to a cell or a measurement (or measurement range) indicative of the distance to the cell, e.g., a timing measurement (TA, eNodeB Rx-Tx, RTT, TOA) or a signal strength measurement;

neighbor cell or radio nodes identifiers;

a direction measurement or a measurement range, e.g., angle-of-arrival (AoA);

an environment type, e.g., indoor or outdoor;

a UE transmit capability or power class; and a UE speed (e.g., a highway may indicate that the UE is possible in one cell but not in the other one).

The parameters above may be obtained from one or more different sources (e.g., measured by the wireless device, measured by eNodeB, received from another network node or from a wireless device), depending on what is the node. For example, if the node is a positioning node, the other parameters/measurement may be received from the wireless device and/or an eNodeB. In another example, when the node is the measuring node (e.g., LMU), the other available parameters/measurements for the wireless device being positioned may be received from the positioning node via SLmAP in a request for UL measurements. The parameters above may also be additionally used in Approach 1.

Given the available measurement performance statistics, a receiving point may be included in the selected list, in some embodiments, if the average or percentile of the uplink measurement quality for wireless devices in the same area or in similar conditions is above a threshold. The performance statistics may be collected and the evaluation may be performed during a training phase, based on drive tests, or dynamically in a real life network. Note that a similar approach may also be used to create the relationship lists in Approach 1.

Approach 3: Determining Based on Positioning Performance Statistics

According to this approach, a node may determine/select receiving points based on positioning performance statistics. For example, positioning performance statistics may be collected for each list of receiving points associated with an area (see, e.g., the relationship structures in Approach 1, above). These positioning performance statistics may represent any suitable information indicating a level of success or failure for positioning attempts performed using the relevant receiving point(s); a quality metric for positioning attempts involving these receiving point(s); and/or any other indication of the results of positioning attempts involving the relevant receiving point(s). Specific examples of such positioning performance statistics include, but are not limited to, an average or percentile accuracy, a measure of positioning errors (e.g., rate, magnitude), and a success rate on positioning attempts involving the relevant receiving point(s). Different sets may be evaluated for the same area, and the best set (based on the achieved positioning performance statistics, e.g., average or percentile accuracy, positioning errors, etc.) may be selected or prioritized. The performance statistics may be collected and the evaluation may be performed during a training phase, based on drive tests, or dynamically in a real life network. Again, a similar approach may also be used to create the relation lists in Approach 1.

Group 3 Techniques: Search Window Adjustment in Deployments with Measuring Nodes Associated with Multiple Receiving Points To reduce the receiver complexity and resource consumption, a search window may be configured for the uplink positioning measurements. For example, currently an LMU may be provided with a search window in a measurement request via SLmAP by the positioning node. In one example, the search window parameters may be described by an expected propagation delay (search window center) and an uncertainty (search window size), where the former may be indicative of the distance between the receiving point and serving eNodeB and the latter may correspond to the distance between the UE and the serving eNodeB, which may be determined, for example, by a timing advance (TA) measurement.

When multiple receiving points are associated with the measuring node, the same search window may be not applicable for all receiving points. When the search window is incorrectly configured, a radio signal may be missed or the measurement may be incorrect, e.g., when the peak falls outside the search window. To solve this problem, the search window may need to be adjusted for some receiving points. Either or both of two approaches, described as "Approach A" and "Approach B," may be used, in various embodiments.

Approach A involves compensation at the measuring receiver. A common reference search window is provided to the measuring node, and the measuring node or the receiver applies a compensation to the search window, when needed, for a given receiving point when performing the measurement using this receiving point. The reference search window may be associated with a reference location, e.g., measuring node location.

In Approach B, compensation is performed by another node. In this approach, a measuring node receives from another node (e.g., a positioning node) search window parameters that enable calculation of the different search windows corresponding to the different receiving points. The search window parameters may comprise, for example, at least two different search window configurations or at least one compensation factor that is to be applied to derive a different search window for a different receiving point. To correctly apply the compensation or derive different search windows, the other node needs to be aware not only of the measuring node location (which may be the reference location) but also of the receiving point location.

In both approaches, the compensation may be pre-configured, stored in a memory or received from another node. The compensation may be the same for co-located receiving points; there may be no compensation or zero compensation when the receiving point location is the reference location. The compensation may depend on (and be calculated based on) the distance between the receiving point and the reference location and/or cable length, for example. The receiving points may be obtained and known to the measuring node, e.g., by applying techniques from Groups 1 and 2, as described above.

In some embodiments, the amount of compensation may be further adjusted accounting for the wireless device mobility, e.g., based on any one or more of: velocity vector, speed, or moving direction.

Group 4 Techniques: Methods of Managing Measurements in Deployments with Measuring Nodes with Multiple Receiving Points According to techniques in this group, to enable using multiple receiving points associated with the same measuring node, different measurement identifications (e.g., Measurement IDs) are assigned to measurements that correspond to different receiving points (antenna sectors, RRH, or antenna branches) associated with the same measuring node (e.g., LMU). In this way, different samples of received signals for the same wireless device uplink transmission may be managed in the measuring node and used to obtain different measurements, which can then be reported to the positioning node (e.g., via SLmAP). The Measurement ID may be UE-specific or per group of UEs. One or more dedicated Measurement IDs may also be reserved or pre-configured for specific location service, UL measurement type, specific UE type or Client Type, specific measurement configuration, or a specific UL transmission type or configuration. In some embodiments, the set of Measurement IDs may be reused in different frequencies and/or different RATs.

Measurement IDs may then be associated or mapped in a pre-defined or in a configurable way with/to different receiver points or the corresponding ports of an antenna sharing unit (ASU).

Techniques in this Group 4 may be combined in different ways with techniques from Groups 1-3. In one such combined embodiment, the mapping of the Measurement ID to a receiving point may be done after obtaining the receiving point configuration (e.g., the set of receiving points) in the node performing the obtaining step (e.g., according to the techniques in Groups 1 and/or 2). The mapping may be pre-defined, configurable or obtained from another node. The mapping may be the same or different for different measuring nodes or it may be site-specific. A pre-defined Measurement ID range may exist. The set of Measurement IDs may also be a function of the number of receiving points associated with a measuring node or a site; it may also be a function of the number of carriers on which the measurements may be performed in parallel for a UE (e.g., 2 carriers for UEs in uplink carrier aggregation). The mapping may be implemented/stored/maintained in one or more nodes, e.g., in a measuring node, a positioning node, an O&M node, a SON node, an eNodeB, a control unit (see, e.g., FIG. 4), and/or antenna sharing modules (software and/or hardware).

According to one example of an implementation according to the Group 4 techniques, a positioning node may obtain one or more of receiving points for one or more measuring nodes and decide Measurement IDs based on the selected receiving points. The Measurement IDs may then be sent to another node, e.g., a measuring node such an LMU, e.g., in a measurement request. The UL measurements may then be performed according to said decided Measurement IDs, e.g., the measuring node (which may be aware of the mapping applied by the positioning node, e.g., by receiving it from positioning node or another node or by applying a pre-defined rule) ensures that the UL measurements are obtained from the selected receiving points based on the received Measurement IDs. The obtained uplink measurements may then be reported back to the positioning node.

In an embodiment, it may be the case that there is always at most M Measuring IDs in a measurement request and measurement report. M may also depend on the deployed antenna systems in the area. For example, M=1 may imply that the measuring node needs to always use one receiving point (indicated by another node or determined by the measuring node) out of a set of receiving points associated with the measuring node. Different Measurement IDs for the same wireless device being positioned may be sent in the same or different message and may be associated with the same or different procedure and/or transaction.

The set of receiving points associated with a measuring node may be known in another node, e.g., a positioning node or an O&M node or an eNodeB. Obtaining the set of receiving points (see Groups 1 and 2) may comprise obtaining the set of all receiving points that are associated with a measuring node or a selected one or more receiving points from the set of all available receiving points. There may also be a measuring node capability indicating whether the measuring node is capable of supporting more than one receiving point. In case, there is always at most one receiving point associated with a measuring node, the Measurement IDs may be assigned without mapping, e.g., randomly or any flexible order decided by, e.g., a positioning node when requesting a measurement.

Example steps in a network node (e.g., positioning node) according to some embodiments of these techniques are as follows:
1. Obtain a set of measuring nodes and a set of receiving points for a wireless device being positioned (see Group 1 and 2 techniques).
2. For each selected measuring node, map the corresponding one or more selected of the selected receiving points to one or more of Measurement IDs.
3. Send a measurement request to each of the selected measuring node, the measurement request comprising the corresponding one or more Measuring IDs.
4. Receive a measurement report with the corresponding one or more Measuring IDs.

Similarly, example steps in a measuring node, according to some embodiments of these techniques, are as follows:
1. Receive a measurement request comprising one or more Measurement IDs.
2. Obtain received radio signals from the receiving points corresponding to the one or more Measurement IDs (the measuring node should be aware of the mapping applied in the positioning node, e.g., the mapping maybe pre-defined or configured or negotiated/exchanged between the measuring node and positioning node in either direction via a direct link e.g. SLmAP or via another node e.g. O&M or negotiated/exchanged between eNodeB and positioning node e.g. via LPPa or O&M).
3. Perform measurements using the received signals from said receiving points
4. Report measurements to the positioning node in a measurement report together with the Measurement ID corresponding to the receiving point used for the measurement.

Example Methods

Figure 8:
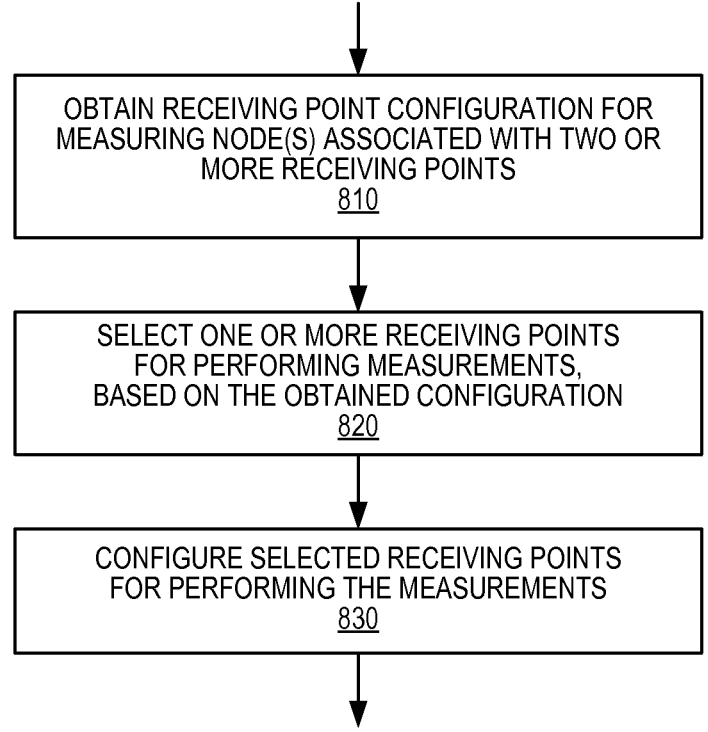
FIG. 8 is a process flow diagram illustrating an example method for controlling measurements.

The process flow diagrams in FIGS. 8-11 illustrate generalized examples of some of the techniques described above. FIG. 8, for example, illustrates a method, as implemented by a network node, for controlling measurements of radio signals transmitted by a wireless device, e.g., according to the techniques of Group 1, wherein the measurements are performed by a measuring node associated with two or more receiving points. It will be appreciated that the variants of the Group 1 techniques described above apply equally to the illustrated process flow, and that the illustrated process may further be combined with other techniques described above.

The process flow of FIG. 8 begins, as shown at block 810, with obtaining a receiving point configuration for at least one measuring node associated with two or more receiving points. As shown at block 820, the method continues with selecting one or more receiving points for performing measurements, based on the obtained configuration. Finally, as shown at block 830, the selected receiving points are configured for performing the measurements.

In some embodiments, the illustrated method may further comprise receiving measurements from the at least one measuring node. In some embodiments, the selected receiving points comprise a subset of two or more receiving points associated with the same measuring node. The selected receiving points may be associated with the same or different locations.

In some embodiments, the illustrated method may further comprise receiving capability information from the measuring node, the capability information characterizing the measuring node's ability to manage measurements on signals from different receiving points. In these embodiments, the selecting of the one or more receiving points may be further based on the received capability information.

In some embodiments, the obtained receiver point configuration may be sent to another node. Obtaining the receiving point configuration may comprise receiving the receiving point configuration from another node, in some embodiments, or retrieving stored receiving point configuration, e.g., from a memory or database, in others.

Some embodiments comprise selectively using measurements received from one or more measuring nodes, based on the obtained receiving point configuration.

In various embodiments, the receiving point configuration may comprise any one or more of: a receiver radio-frequency (RF) characteristic; a frequency or frequency range; a receive bandwidth; a radio frequency (RF) configuration parameter; an antenna configuration; an antenna pattern configuration; an antenna polarization configuration; a radio beam configuration; an antenna array configuration; a receiver type; a received signal measurement reference point; and parameters associated with the location or installation of the receiving point.

Some embodiments may further comprise configuring, based on the obtained receiving point configuration, one or more search window parameters for one or more of the at least one measuring nodes.

Selecting the subset of receiving points may comprise, in some embodiments, determining the subset of receiving points based on an association between a serving cell for the wireless device and the receiving points in the subset. The subset of receiving points may alternatively or additionally be selected based on an approximate location for the wireless device and based on locations of the receiving points in the subset. The selection may be based on measurement performance statistics corresponding to the receiving points in the subset, in some embodiments. Some of these latter embodiments may further comprise receiving measurement performance information for positioning measurements performed for the wireless device and updating measurement performance statistics based on the received positioning performance information.

In some embodiments, selecting the subset of receiving points may comprise determining the subset of receiving points based further on positioning performance statistics corresponding to the receiving points in the subset. Some of these embodiments may further comprise receiving positioning performance information for a positioning operation performed for the wireless device and updating positioning performance statistics based on the received positioning performance information.

Some embodiments may further comprise configuring one or more measurement nodes associated with the selected subset to perform positioning measurements for the wireless device. These and still other embodiments may comprise sending identifiers for the selected subset to a second network node.

Figure 9:
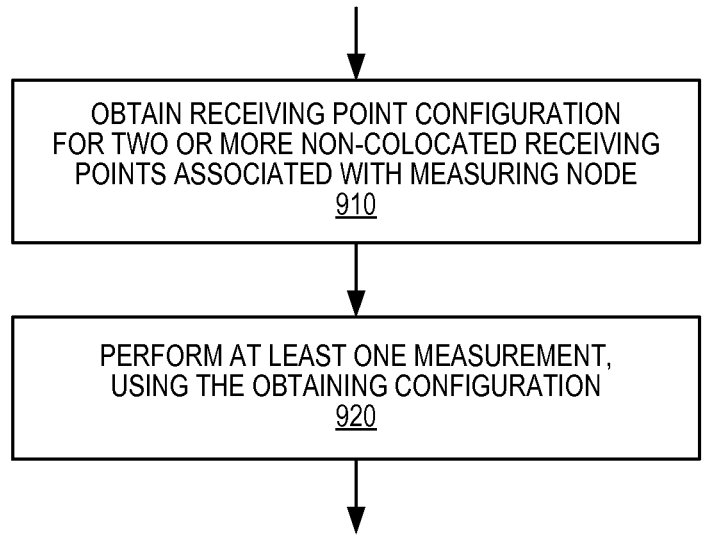
FIGS. 9, 10, and 11 are process flow diagrams illustrating related methods.

FIG. 9 is a process flow diagram illustrating a related method, this one suitable for implementation in a measuring node adapted to measure radio signals transmitted by a wireless device. As shown at block 910, the method begins with obtaining receiving point configuration for two or more non-colocated receiving points associated with the measuring node. As shown at block 920, the method continues with performing at least one measurement using the obtained configuration.

In some embodiments, the illustrated method continues with sending the measurement to another node, e.g., to a positioning node. In some embodiments, performing the at least measurement comprises selectively performing the measurement.

In several embodiments, the obtaining of the receiving point configuration comprises receiving the receiving point configuration from another node. In these or in any other embodiment, the receiving point configuration may comprise any one or more of: a receiver radio-frequency (RF) characteristic; a frequency or frequency range; a receive bandwidth; a radio frequency (RF) configuration parameter; an antenna configuration; an antenna pattern configuration; an antenna polarization configuration; a radio beam configuration; an antenna array configuration; a receiver type; a received signal measurement reference point; and parameters associated with the location or installation of the receiving point.

Figure 10:
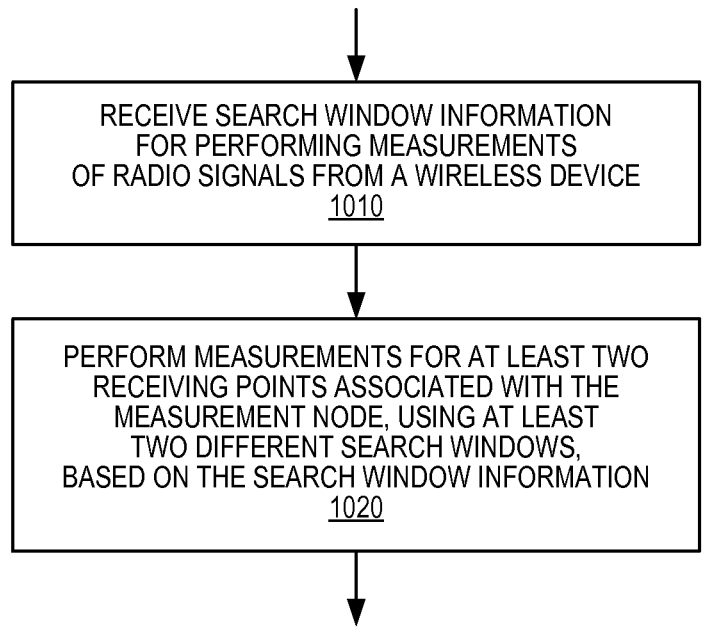

FIG. 10 illustrates another related method, this one also suitable for implementation in a measurement node adapted to measure radio signals transmitted by a wireless device. As shown at block 1010, the method begins with receiving search window information for performing measurements of radio signals from a wireless device. As shown at block 1020, the method continues with performing measurements for at least two receiving points associated with the measurement node, using at least two different search windows, based on the search window information.

In some embodiments, the search window information comprises a common reference search window, in which case the method may further comprise adjusting the reference search window to obtain the search window for at least measurements associated with one of the receiving points. In some of these embodiments, the common reference search window is based on a location for the measurement node, and adjusting the reference search window is based on the receiving point location.

In some embodiments, receiving search window information comprises receiving search window parameters for each of the at least two receiving points, and the method further comprises determining the search window for each of the at least two receiving points based on the received search window parameters. In some methods, search windows for the at least two receiving points are based on one or more mobility parameters for the wireless device.

Figure 11:
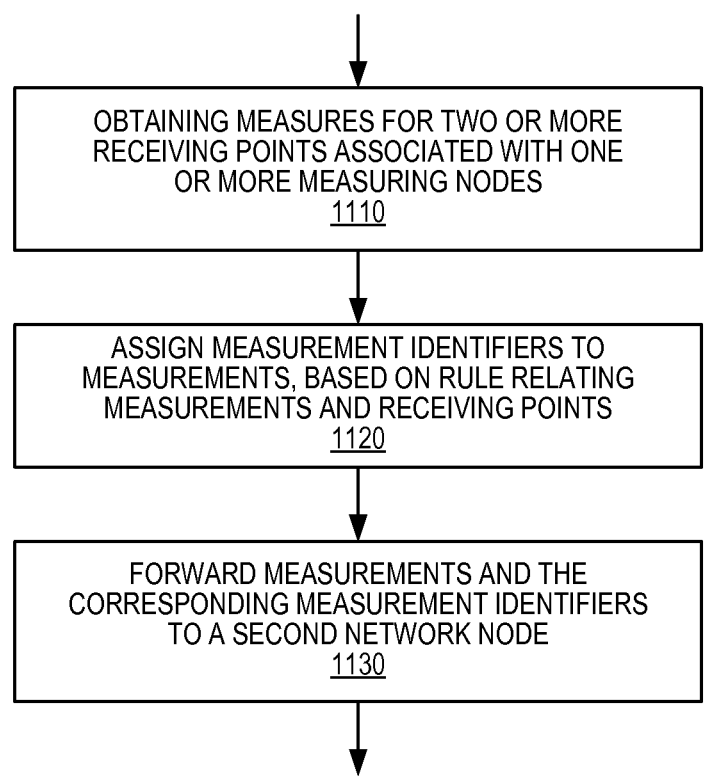

FIG. 11 illustrates yet another related method, this one suitable for implementation in a first network node. As shown at block 110, the method begins with obtaining measurements for two or more receiving points associated with one or more measuring nodes, wherein at least one of the measuring nodes is associated with two or more of the receiving points. Next, as shown at block 1120, measurement identifiers are assigned to the measurements, based on a rule relating measurements and receiving points, where each measurement identifier corresponds to one or more receiving points. Finally, as shown at block 1130, the measurements and the corresponding measurement identifiers are forwarded to a second network node. In some embodiments, the illustrated method may further comprise first receiving a measurement request, the measurement request identifying the two or more receiving points using corresponding measurement identifiers.

Example Implementations

Figure 5:
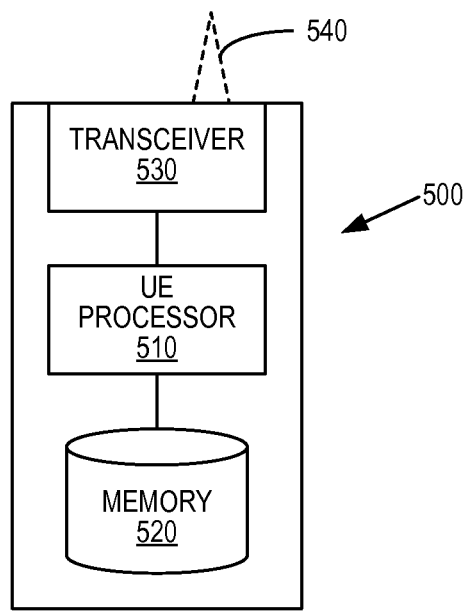
FIG. 5 illustrates components of an example mobile terminal (UE) according to some embodiments.
Figure 6:
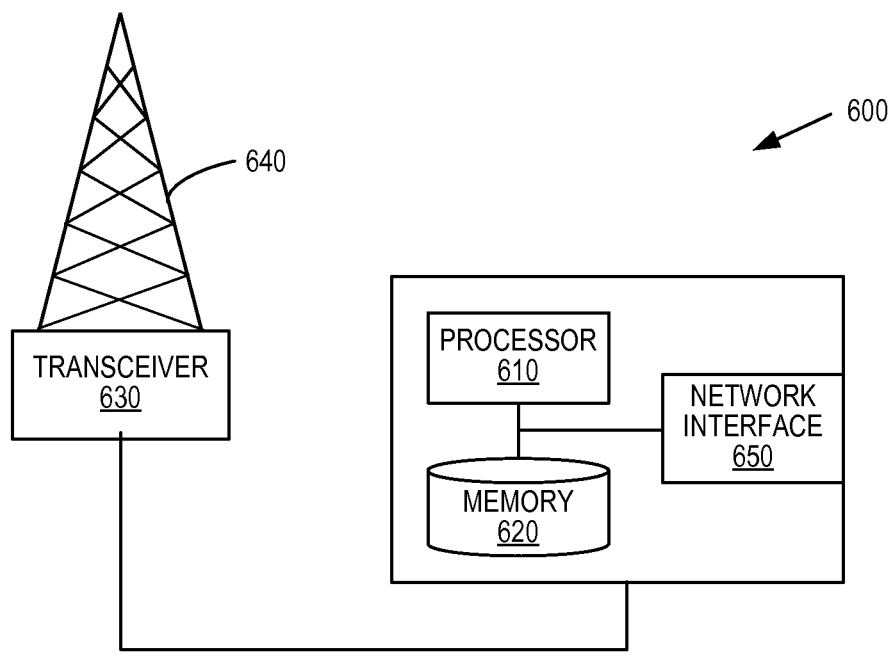
FIG. 6 illustrates components of an example radio network node.
Figure 7:
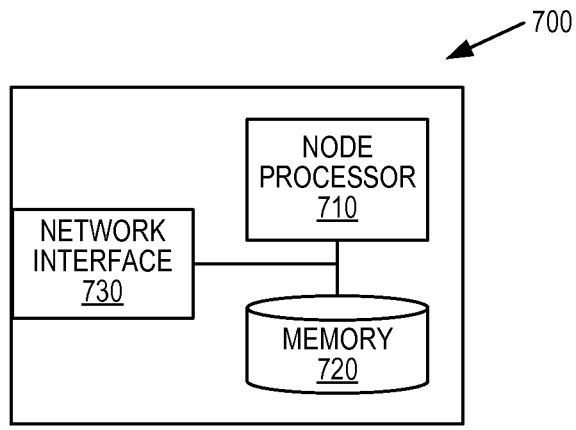
FIG. 7 is a block diagram showing components of an example network node.

As explained above, the described techniques, including the methods illustrated in FIGS. 8-11 and the variations thereof, may be implemented in telecommunication networks that include various elements. For example, as shown in FIG. 1, certain implementations of the proposed solutions may utilize a network that serves one or more instances of user equipment (UEs) and includes components such as a radio network node (e.g., an eNodeB) and various different types of network nodes (e.g., a positioning node, a measuring node, a coordinating node). Although these components may represent devices that include any suitable combination of hardware and/or software, FIGS. 5-7 illustrate example embodiments of these devices that may be suitable for use in certain implementations of the described techniques. Additionally, while FIG. 1 illustrates, for the sake of simplicity, each of the various network nodes as distinct components, any of these network nodes may represent the same physical device as another of the network nodes or of any of the radio network nodes. For example, in particular embodiments, the measuring node may be implemented as part of an eNodeB or other radio network node.

FIG. 5 shows an example UE 500 that may be utilized in certain implementations of the described solutions. The example UE 500 includes a processor 510 (e.g., a microprocessor, microcontroller, digital signal processor, digital logic, or some combination thereof), a memory 520, a transceiver 530, and an antenna 540. In particular embodiments, some or all of the functionality described above as being provided by mobile communication devices or other forms of UEs may be provided by the UE processor 510 executing instructions stored on a computer-readable medium, such as the memory 520 shown in FIG. 5. In such embodiments, the processor 510 and memory 520 may together be considered a processing circuit. Alternative embodiments of the UE may include additional components beyond those shown in FIG. 5, which components may be responsible for providing certain aspects of the UE's functionality, including any of the functionality described above and/or any functionality necessary to support the solution described above.

Likewise, FIG. 6 shows an example radio network node 600 that may be utilized in certain implementations of the described techniques. This example radio network node 600 includes a processor 610, a memory 620, a transceiver circuit 630, and an antenna 640, as well as a network interface circuit 650 that connects the radio network node 600 to other nodes in a wireless communications network. In particular embodiments, some or all of the functionality described above as being provided by a mobile base station, a base station controller, a node B, an enhanced node B, a relay station, an access point, and/or any other type of mobile communications node may be provided by the base station processor 610 executing instructions stored on a computer-readable medium, such as the memory 620 shown in FIG. 6. Once again, in such embodiments, the processor 610 and memory 620 may together be considered a processing circuit. Alternative embodiments of the radio network node may include additional components responsible for providing additional functionality, including any of the functionality identified above and/or any functionality necessary to support the solution described above.

FIG. 7 shows an example network node that may be utilized in certain implementations of the described solutions. One or more instances of this example network node may be used to implement, separately or jointly, any or all of a coordinating node, a positioning node, and a measuring node in networks that utilize such components to provide the described solutions. The example network node includes a processor 710, a memory 720, and a network interface circuit 730. In particular embodiments, some or all of the functionality described above as being provided by a the various types of network nodes may be provided by the node processor 710 executing instructions stored on a computer-readable medium, such as the memory 720 shown in FIG. 7, the processor 710 and memory 720 thus together providing a processing circuit. Alternative embodiments of the network node may include additional components responsible for providing additional functionality, including any of the functionality identified above and/or any functionality necessary to support the solution described above.

With these and other variations and extensions in mind, those skilled in the art will appreciate that the foregoing description and the accompanying drawings represent non-limiting examples of the systems and apparatus taught herein for facilitating load balancing in a data packet network. As such, the present invention is not limited by the foregoing description and accompanying drawings. Instead, the present invention is limited only by the following claims and their legal equivalents.

What is claimed is:

1. A method, in a first network node, the method comprising:
   obtaining measurements for two or more receiving points associated with one or more measuring nodes, wherein at least one of the measuring nodes is associated with two or more of the receiving points;
   assigning measurement identifiers to the measurements, based on a rule relating measurements and receiving points, wherein each measurement identifier corresponds to one or more receiving points; and
   forwarding the measurements and the corresponding measurement identifiers to a second network node.

2. The method of claim 1, further comprising first receiving a measurement request, the measurement request identifying the two or more receiving points using corresponding measurement identifiers.

3. A first network node, comprising:
   a network interface circuit, and
   a processing circuit, wherein the processing circuit is configured to:
      obtain measurements for two or more receiving points associated with one or more measuring nodes, wherein at least one of the measuring nodes is associated with two or more of the receiving points;
      assign measurement identifiers to the measurements, based on a rule relating measurements and receiving points, wherein each measurement identifier corresponds to one or more receiving points; and
      forward the measurements and the corresponding measurement identifiers to a second network node.

4. The first network node of claim 3, wherein the processing circuit is further configured to first receive a measurement request, the measurement request identifying the two or more receiving points using corresponding measurement identifiers.

* * * * *